US007693805B2

(12) United States Patent
Koran (10) Patent No.: US 7,693,805 B2
(45) Date of Patent: Apr. 6, 2010

(54) AUTOMATIC IDENTIFICATION OF DISTANCE BASED EVENT CLASSIFICATION ERRORS IN A NETWORK BY COMPARING TO A SECOND CLASSIFICATION USING EVENT LOGS

(75) Inventor: Joshua M. Koran, Mountain View, CA (US)

(73) Assignee: Yahoo, Inc., Sunnyvale, CA (US)

( * ) Notice: Subject to any disclaimer, the term of this patent is extended or adjusted under 35 U.S.C. 154(b) by 498 days.

(21) Appl. No.: 11/497,909

(22) Filed: Aug. 1, 2006

(65) Prior Publication Data

US 2008/0034083 A1 Feb. 7, 2008

(51) Int. Cl.
  *G06E 1/00* (2006.01)
  *G06E 3/00* (2006.01)
  *G06G 7/00* (2006.01)
(52) U.S. Cl. ........................................................ 706/20
(58) Field of Classification Search ..................... 706/20
  See application file for complete search history.

(56) References Cited

U.S. PATENT DOCUMENTS 6,571,239 B1 * 5/2003 Cole et al. ...................... 707/5
2005/0234953 A1 * 10/2005 Zhang et al. ................ 707/101

OTHER PUBLICATIONS

Geoff Hulten, Laurie Spencer, and Pedro Domingos. "Mining Time-Changing Data Streams" Proceedings of the seventh ACM SIGKDD international conference on Knowledge discovery and data mining. ACM 2001.*

Kardi Teknomo "K Nearest Neighbors Tutorial" pp. "What is K-nearest Neighbor (KNN) Algorithm" and "How K-Nearest Neighbor (KNN) algorithm works?" Verified by wayback machine 2005. http://web.archive.org/web/20050422081730/http://people.revoledu.com/kardi/tutorial/KNN/index.html. Current link: http://people.revoledu.com/kardi/tutorial/KNN/index.h.*

* cited by examiner

*Primary Examiner*—David R Vincent
*Assistant Examiner*—Ben M Rifkin
(74) *Attorney, Agent, or Firm*—Stattler-Suh PC (57) ABSTRACT

A system and method to facilitate automatic identification of event classification errors in a network are described. Session data containing events logged by a user entity over a network in a predetermined period of time is retrieved from one or more event logs. Each event is further parsed to generate one or more event units. A frequency parameter of co-occurrence of the event units within each event of the session data is further determined and at least one session distance is determined among the events based on the frequency parameter. At least one classification distance is further retrieved from a data storage module, such as, for example, a database or a datastore, the one or more classification distances representing a relation between the events and corresponding classification categories within the database or datastore. Each session distance is further compared to each retrieved classification distance to ascertain event classification errors within the database or datastore. A predetermined error code is then assigned to each event if the corresponding session and classification distances are different. Finally, a list of classification errors containing the identified events and their corresponding error codes is output for further review and analysis, either through manual editing or, in the alternative, through automatic editing.

25 Claims, 6 Drawing Sheets

AUTOMATIC IDENTIFICATION OF DISTANCE BASED EVENT CLASSIFICATION ERRORS IN A NETWORK BY COMPARING TO A SECOND CLASSIFICATION USING EVENT LOGS

TECHNICAL FIELD

The present invention relates generally to the field of network-based communications and, more particularly, to a system and method to facilitate automatic identification of event classification errors in a network, such as the Internet.

BACKGROUND OF THE INVENTION

The explosive growth of the Internet as a publication and interactive communication platform has created an electronic environment that is changing the way business is transacted. As the Internet becomes increasingly accessible around the world, users need efficient tools to navigate the Internet and to find content available on various websites.

Internet portals provide users an entrance and guide into the vast resources of the Internet. Typically, an Internet portal provides a range of search, email, news, shopping, chat, maps, finance, entertainment, and other content and services. Thus, the information presented to the users needs to be efficiently and properly categorized and stored within the portal.

SUMMARY OF THE INVENTION

A system and method to facilitate automatic identification of event classification errors in a network are described. In one embodiment, session data containing events logged by a user entity over a network in a predetermined period of time is retrieved from one or more event logs. Each event is further parsed to generate one or more event units. A frequency parameter of co-occurrence of the event units within each event of the session data is further determined and at least one session distance is determined among the events based on the frequency parameter. At least one classification distance is further retrieved from a data storage module, such as, for example, a database or a datastore, the one or more classification distances representing a relation between the events and corresponding classification categories within the database or datastore. Each session distance is further compared to each retrieved classification distance to ascertain event classification errors within the database or datastore. A predetermined error code is then assigned to each event if the corresponding session and classification distances are different. Finally, a list of classification errors containing the identified events and their corresponding error codes is output for further review and analysis, either through manual editing or, in the alternative, through automatic editing.

Other features and advantages of the present invention will be apparent from the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

Actions or events initiated and input by a user or an agent of the user over a network, such as, for example, search queries, web page views, and/or advertisement clicks, are generally classified and stored into a data storage module, such as, for example, a database or datastore, and are organized into a plurality of predetermined categories mapped into a hierarchical taxonomy or, in the alternative, stored as a collection of non-heriarchical categories within the database or datastore.

Over time, definitions or just the plain meaning of certain stored events change and, consequently, their respective classifications change as well. Automatic and/or manual categorization techniques have difficulty reviewing and updating such a large number of events, especially when the previous updates are not precisely known.

The system and method described in detail below perform data-driven discovery of event classification errors, either through omission (i.e., a category could apply to the event but is not yet assigned to the event) or misclassification (i.e., a category has been wrongly associated with an event).

In one described embodiment, session data containing events logged by a user or user agent over a network in a predetermined period of time is retrieved from one or more event logs. Each event is further parsed to generate one or more event units. A frequency parameter of co-occurrence of the event units within each event of the session data is further determined and at least one session distance is determined among the events based on the frequency parameter.

At least one classification distance is further retrieved from a data storage module, such as, for example, a database or datastore, the classification distances representing a relation between the events and corresponding classification categories within the data storage module. Each session distance is further compared to each retrieved classification distance to ascertain event classification errors within the data storage module. If a predetermined number of co-occurring event units have a sufficiently larger distance than the pre-existing classification distance of similar event units, then a predetermined error code is assigned to each event.

In an alternate embodiment, the data storage module stores multiple successive instances of classification distances between events and corresponding classification categories at various intervals of time. Thus, in the alternate embodiment, the time associated with the current set of events within the session data and the time associated with the classification of prior session events is used in combination with the distance function to ascertain classification errors within the data storage module. For example, at least two classification distances generated from data stored at different time intervals may be retrieved and further compared to ascertain event classification errors, wherein a most recently generated classification distance is given more weight when conflicts in classification are identified.

Finally, a list of classification errors containing the identified events and their corresponding error codes is output for further review and analysis, either through manual editing or, in the alternative, through automatic editing.

Figure 1:
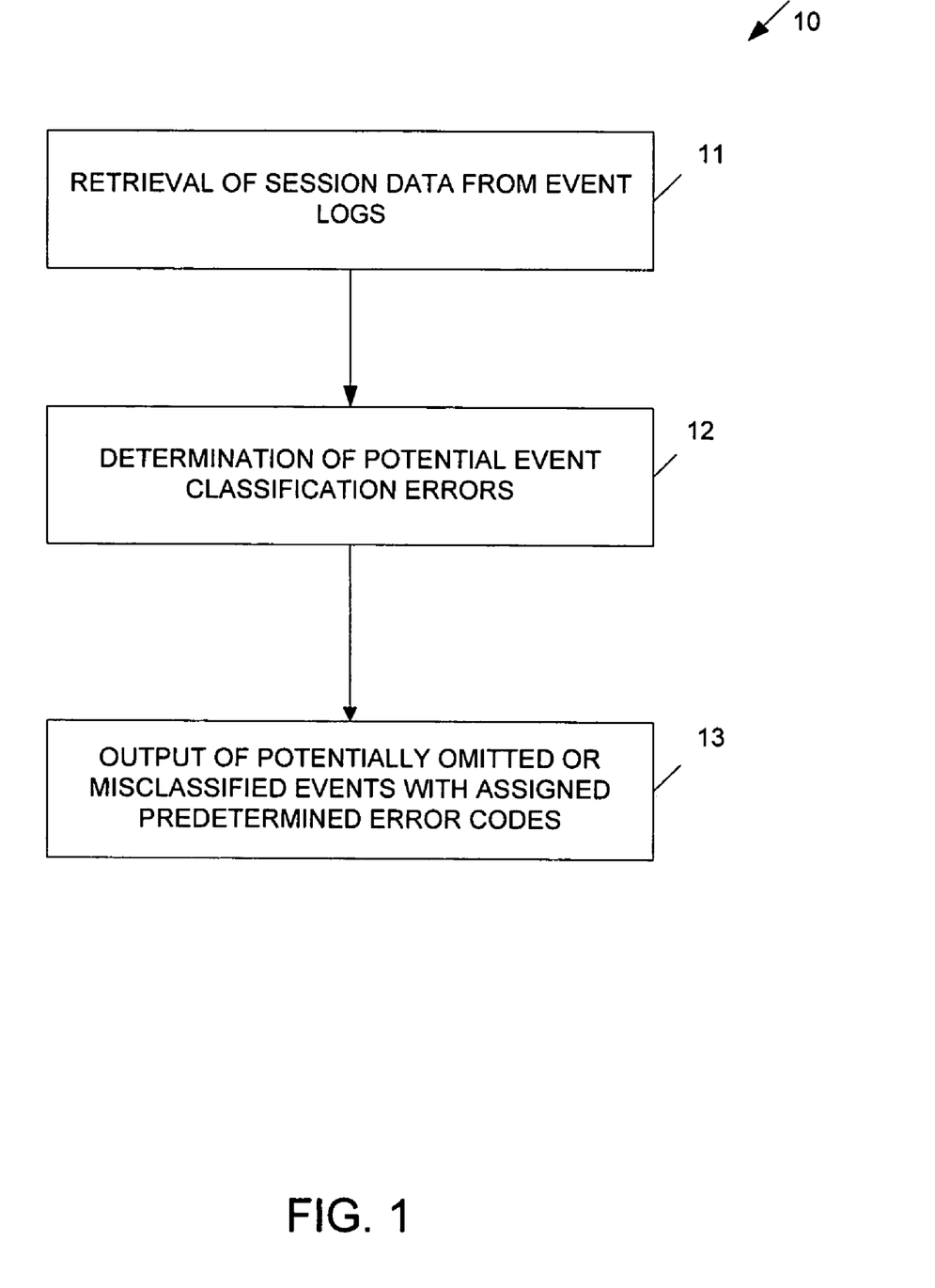
FIG. 1 is a flow diagram illustrating an event processing sequence, according to one embodiment of the invention.

FIG. 1 is a flow diagram illustrating an event processing sequence, according to one embodiment of the invention. As shown in FIG. 1, at processing block 11, the sequence 10 starts with retrieval of session data from one or more event logs. In one embodiment, data includes multiple events performed within one or more user search and navigation sessions, which have been previously stored within the event logs to be used in subsequent generation of catalogs or behavioral profiles. In one embodiment, a user search and navigation session encompasses activity that a user entity with a unique Internet Protocol (IP) address, such as, for example, a user or an agent of the user, performs in a predetermined period of time, which may or may not overlap with previous sessions associated with the same user.

In one embodiment, an event is a type of action initiated by a user, typically through a conventional mouse click command. Events include, for example, advertisement clicks, search queries, search clicks, sponsored listing clicks, page views and advertisement views. However, events, as used herein, may include any type of online navigational interaction or search-related events.

Generally, a page view event occurs when the user views a web page. In one example, a user may enter a web page for music within an Internet portal by clicking on a link for the music category page. Thus, a page view event is classified as the user's view of the music category page. In one embodiment, the page view event may be classified by the text occurring on the web page. In addition, the co-occurrence or sequence of page view events may be used to classify a set of page view events.

An advertisement view event occurs when the user views a web page for an advertisement. For example, an Internet portal may display banner advertisements on the home page of the portal. If the user clicks on the banner advertisement, the portal redirects the user to the link for the corresponding advertiser. The display of a web page, in response to the conventional mouse click command, constitutes an advertisement click event. A user may then generate multiple page view events by visiting multiple web pages at the advertiser's web site.

An advertisement click event occurs when a user clicks on an advertisement. For example, a web page may display a banner advertisement. An advertisement click event occurs when the user clicks on the banner advertisement.

A search query event occurs when a user submits one or more search terms within a search query to a web-based search engine. For example, a user may submit the query "New York Fire Department", and a corresponding search query event containing the search terms "New York Fire Department" is recorded. In response to a user query, a web-based search engine returns a plurality of links to web pages relevant to the corresponding search query terms. If a user clicks on one of the links, a search click event occurs.

A sponsored listing advertisement refers to advertisements that are displayed in response to a user's search criteria. A sponsored listing click event occurs when a user clicks on a sponsored listing advertisement displayed for the user.

Next, referring back to FIG. 1, data processing is performed at processing block 12. In one embodiment, a determination of event classification errors for each event within the retrieved data, such as, for example, omission errors and/or misclassification errors, is performed within the network-based entity, as described in further detail below.

Next, the sequence 10 continues at processing block 13 with an output of a list of omitted or misclassified events for further correction and storage within an updated database.

Figure 2:
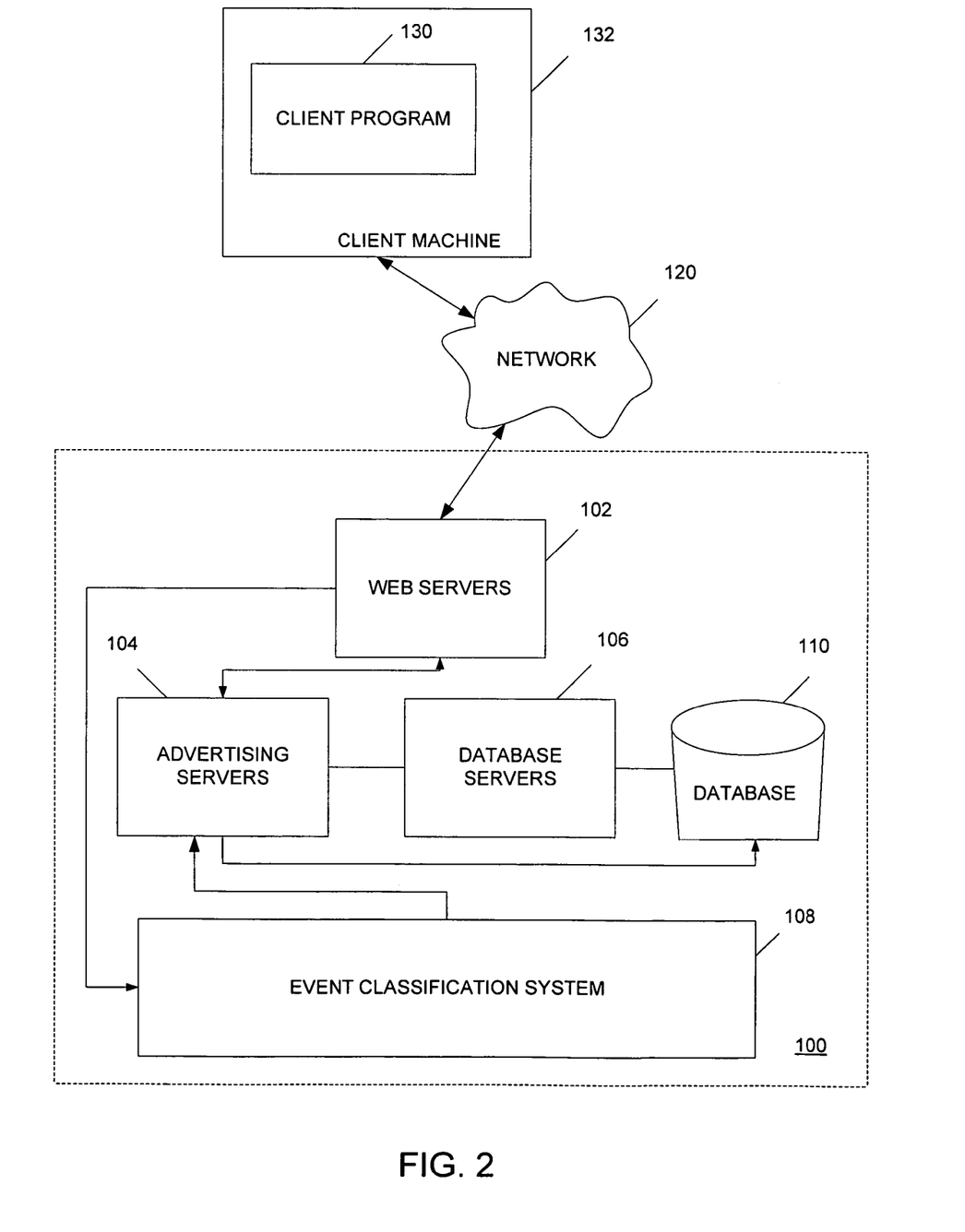
FIG. 2 is a block diagram illustrating an exemplary network-based entity containing a system to facilitate automatic identification of event classification errors, according to one embodiment of the invention.

FIG. 2 is a block diagram illustrating an exemplary network-based entity, which facilitates automatic identification of event classification errors. While an exemplary embodiment of the present invention is described within the context of an entity 100 enabling automatic identification of event classification errors, it will be appreciated by those skilled in the art that the invention will find application in many different types of computer-based, and network-based, entities, such as, for example, commerce entities, content provider entities, or other known entities having a presence on the network.

In one embodiment, the entity 100, such as, for example, an Internet portal, includes one or more front-end web processing servers 102, which may, for example, deliver web pages to multiple users, (e.g., markup language documents), handle search requests to the entity 100, provide automated communications to/from users of the entity 100, deliver images to be displayed within the web pages, deliver content information to the users, and other processing servers, which provide an intelligent interface to the back-end of the entity 100.

The entity 100 further includes one or more back-end servers, for example, one or more advertising servers 104, and one or more data storage servers, such as the database servers 106, each of which maintaining and facilitating access to one or more respective data storage modules, such as, for example, one or more databases 110. In one embodiment, the advertising servers 104 are coupled to a respective database 110 and are configured to select and transmit content, such as, for example, advertisements, sponsored links, integrated links, and other types of advertising content, to users via the network 120. In one embodiment, the entity 100 further includes a system 108 to facilitate automatic identification of event classification errors within the network-based entity 100, as described in further detail below, the system 108 being coupled to the web servers 102 and the advertising servers 104.

The network-based entity 100 may be accessed by a client program 130, such as a browser (e.g., the Internet Explorer browser distributed by Microsoft Corporation of Redmond, Wash.) that executes on a client machine 132 and accesses the facility 100 via a network 120, such as, for example, the Internet. Other examples of networks that a client may utilize to access the entity 100 includes a wide area network (WAN), a local area network (LAN), a wireless network (e.g., a cellular network), the Plain Old Telephone Service (POTS) network, or other known networks.

Figure 3:
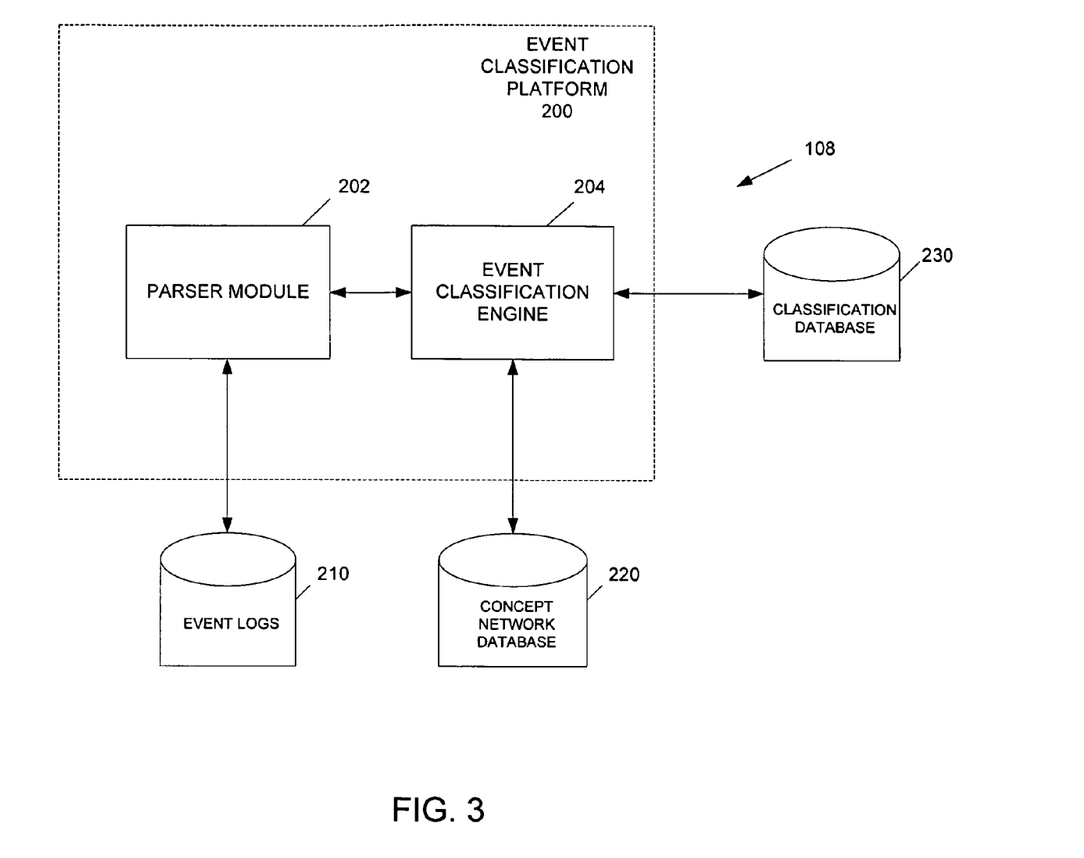
FIG. 3 is a block diagram illustrating the system to facilitate automatic identification of event classification errors within the network-based entity, according to one embodiment of the invention.

FIG. 3 is a block diagram illustrating a system 108 to facilitate automatic identification of event classification errors within the network-based entity, according to one embodiment of the invention. As illustrated in FIG. 3, the system 108 includes an event classification platform 200 coupled to multiple data storage modules, such as, for example, one or more event logs 210, a concept network database 220, and a classification database 230, which will be described in further detail below.

In one embodiment, the event logs 210 store various events, collected automatically or, in the alternative, manually, during user search and navigation sessions from various servers within the entity 100, from editors associated with the entity 100, and/or from other third-party entities connected to the entity 100 via the network 120. The event classification platform 200 retrieves the stored events from the event logs 210, such as, for example, search queries transmitted by users or user agents via the network 120, web page views, advertising page views, search results clicks, advertisement clicks, and/or other types of interactive events, and enables automatic identification of event classification errors, as described in further detail below.

In one embodiment, the classification database 230 stores a list of events organized into a hierarchical taxonomy based on multiple categories, such that events in the same classification category are mapped closer together, either manually or automatically, and are characterized by a predetermined classification distance. Editors associated with the entity 100, and/or other third-party entities connected to the entity 100 via the network 120, input various categories within the classification database 230 and edit the classification categories as prompted by the entity 100. Alternatively, users may also create new classification categories through third party entities connected with the entity 100 and may store these categories into the classification database 230, subject to review by editors within the entity 100.

The mapping assigns each stored event to one or more categories, the events being subsequently stored within the classification database 230 at respective nodes associated with each corresponding category. For example, the taxonomy of stored categories may comprise a high-level category for "cities," and several sub-categories, located hierarchically below the "cities" category, and illustrating different objectives associated with each particular city, such as, for example, "restaurants," "parks," "city services."

However, it is to be understood that any other representation of a taxonomy used to classify subject matter may be used in conjunction with the event classification platform 200 within the system 108 without deviating from the spirit or scope of the invention. In addition, in an alternate embodiment, the assigned categories may not be mapped into a hierarchical taxonomy and may instead be stored as a collection of categories within the classification database 230.

In another alternate embodiment, the classification database 230 may store multiple successive instances of classification distances between events and corresponding classification categories at various intervals of time.

In one embodiment, the event classification platform 200 further includes a parser module 202 configured to receive each retrieved event, such as, for example, a search query or a web page view, and to parse the event to generate multiple event units, such as, for example, query terms or page units, respectively. The event classification platform 200 further includes an event classification engine 204 coupled to the parser module 202 and configured to receive the event units from the parser module 202 and to identify any event classification errors, such as, for example, an event omission or an event misclassification, as described in further detail below.

In one embodiment, the event classification platform 200 retrieves the stored events from the event logs 210, such as, for example, search queries transmitted by users via the network 120, web page views, advertising page views, search results clicks, advertisement clicks, and/or other types of interactive events performed by the user or a user's agent during a predetermined number of user sessions. The parser module 202 within the event classification platform 200 parses each of the retrieved events and generates one or more event units corresponding to each respective parsed event. In one example, the event classification platform 200 retrieves multiple search queries such as, "Paris Hilton Celebrity," "Paris Hilton Music CD," and "Paris Hilton Gala Event." The parser module 202 parses the retrieved search queries as follows:

"Paris Hilton Celebrity"="Paris," "Hilton," and "Celebrity"

"Paris Hilton Music CD"="Paris," "Hilton," and "Music CD"

"Paris Hilton Gala Event"="Paris," "Hilton," "Gala," and "Event."

In one embodiment, the events (i.e., search queries) and their respective event units are further transmitted to the event classification engine 204 for further processing. In an alternate embodiment, the parser module may parse web page views related to the user session and extract multiple page units, such as, for example, "Paris," Hilton," and "Music CD," which are subsequently forwarded to the event classification engine 204.

The event classification engine 204 analyzes the received data and determines a frequency parameter of co-occurrence of the event units within the predetermined number of user search and navigation sessions. In the example presented above, the event classification engine 204 identifies the event units "Paris," "Hilton," as having a high frequency of appearance within the sessions, especially as a sub-string unit "Paris Hilton," in connection with previously classified celebrity entertainment-related event units. The event classification engine 204 also recognizes the co-occurrence frequency of the "Paris Hilton" sub-string unit with previously classified travel-related event units. Based on the co-occurrence frequency distance related to the "Paris Hilton" sub-string unit and the "Music CD" sub-string unit, the event classification engine 204 further determines that the entire search string is entertainment-related rather than travel-related.

In one embodiment, the event classification engine 204 further determines at least one session distance among the received events based on the frequency parameter. The sum of all session distances among events within the session forms a concept network of event units, which is further stored within a concept network database 220 within the event classification system 108. In the above example, the search queries "Paris Hilton Celebrity," "Paris Hilton Music CD," and "Paris Hilton Gala Event" are related and close to one another from a session distance perspective and, thus form a concept network region containing the "Paris Hilton" sub-string unit.

An independent measure of distance among events and their corresponding event units can be established from their category classification within the classification database 230, either manually or automatically assigned to each event stored within the database 230. Events in the same classification category are related and close to one another in an orthogonal dimension.

As a result, in one embodiment, the event classification engine 204 accesses the classification database 230 to retrieve one or more classification distances for the events stored within the event logs 210 during the predetermined number of user search and navigation sessions. Based on the parsed event units, the event classification engine 204 searches the classification database 230 to extract the corresponding classification distances. In the above example, the event classification engine 204 searches the event units associated with the "Paris Hilton Celebrity," "Paris Hilton Music CD," and "Paris Hilton Gala Event" queries and retrieves a classification distance that characterizes "Paris" and "Hilton" events in connection with a "Travel" category and a "Hotels" category, respectively.

In one embodiment, the event classification engine 204 further compares the collective session distances related to the received event units with the retrieved classification distances to ascertain whether the event units stored within the classification database 230 are properly classified within the respective classification categories. If a session distance and a classification distance are different, the event is either likely misclassified or likely omitted from the classification database 230. As a result, if an event is defined as "closely related" by the classification dimension, but is characterized as "remotely related" by the concept network dimension, then the event is likely to be misclassified. Consequently, if an event is defined as "remotely related" by the classification dimension, but is characterized as "closely related" by the concept network dimension, then the event is likely to be unnecessarily omitted from the proper classification category.

In our example, the event classification engine 204 analyzes the search queries to determine if the one or more classification categories are proper or if each query is potentially misclassified or inadvertently omitted from the classification database 230. Considering the "Paris Hilton Celebrity," "Paris Hilton Music CD," and "Paris Hilton Gala Event" search queries, the event classification engine 204 determines that "Paris Hilton" is closely related to the "Travel" or "Hotels" categories from a classification dimension, but remotely related from the concept network dimension, which identifies the search queries containing "Paris Hilton" as closely related to a "Celebrity Entertainment" category, for example. Thus, the event classification engine 204 identifies the "Paris Hilton"-related events as potentially misclassified and assigns a predetermined error code to each event.

In an alternate embodiment, the time associated with the current set of events within the session data and the time associated with the classification of prior session events is used in combination with the distance function to ascertain classification errors within the data storage module. For example, at least two classification distances generated from data stored at different time intervals may be retrieved and further compared to ascertain event classification errors, wherein a most recently generated classification distance is given more weight when conflicts in classification are identified.

Finally, in one embodiment, the event classification engine 204 outputs a list of classification errors containing the identified events and their corresponding error codes for further analysis, either through manual editing by editors associated with the entity 100, or, in the alternative, through automatic editing within the entity 100.

In one embodiment, the misclassified events are reassigned to corresponding proper categories within the classification database 230. Alternatively, events misclassified due to acquisition of a new meaning over a period of time are added to the corresponding new categories within the classification database 230, while maintaining their previously assigned categories. At the same time, in one embodiment, the inadvertently omitted events are classified within the corresponding proper categories within the classification database 230.

Figure 4:
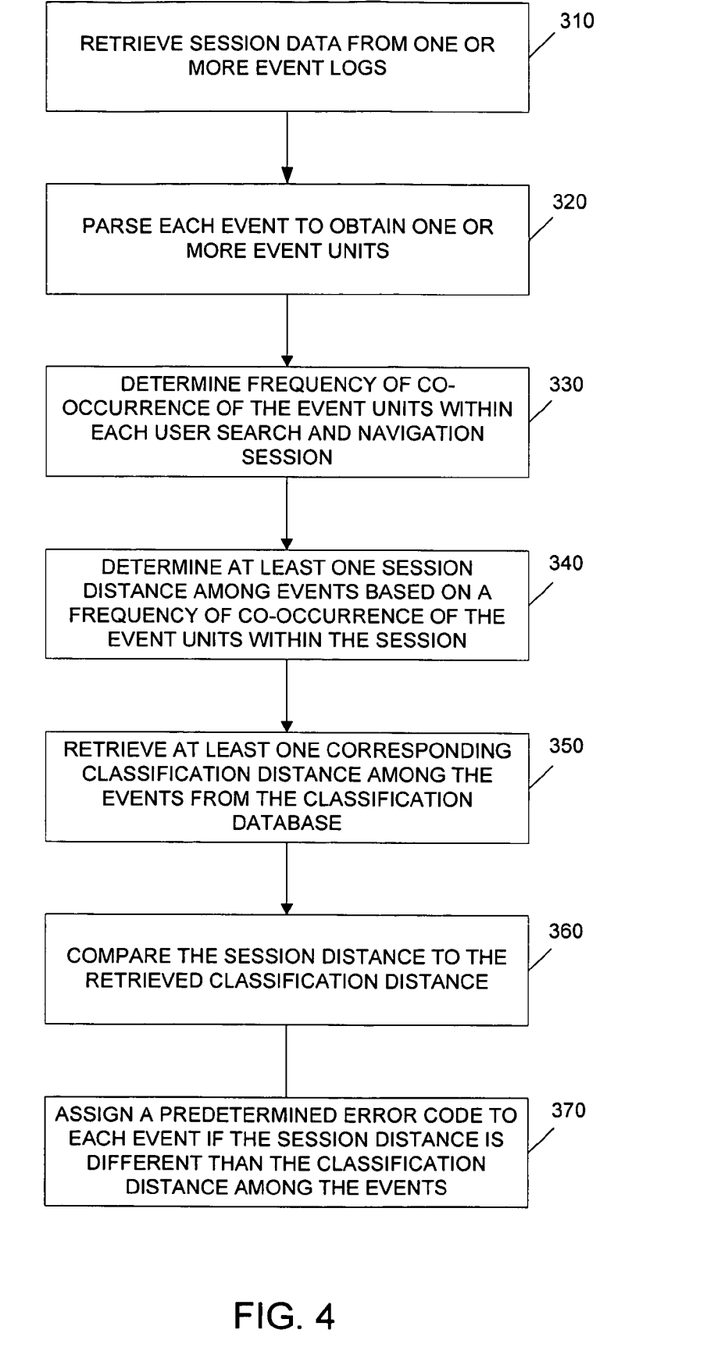
FIG. 4 is a flow diagram illustrating a method to facilitate automatic identification of event classification errors in a network, according to one embodiment of the invention.

FIG. 4 is a flow diagram illustrating a method to facilitate automatic identification of event classification errors in a network, according to one embodiment of the invention. As illustrated in FIG. 4, at processing block 310, session data is retrieved from one or more event logs 210. In one embodiment, the event classification platform 200 accesses the event logs 210 and retrieves events stored within a predetermined number of user search and navigation sessions.

At processing block 320, each event is parsed to generate one or more event units. In one embodiment, the parser module 202 parses each retrieved event, such as, for example, each search query, to obtain one or more event units (e.g., query terms), and further transmits the retrieved events and their corresponding event units to the event classification engine 204 for further processing.

At processing block 330, a frequency parameter of co-occurrence of the parsed event units within the user search and navigation sessions is determined. In one embodiment, the event classification engine 204 receives the parsed event units and determines the frequency of occurrence of the event units within the user sessions.

At processing block 340, at least one session distance among the events is determined based on the frequency of co-occurrence of the event units within the user sessions. In one embodiment, the event classification engine 204 establishes one or more ontological distances among the events, which characterize a relationship among the events based on how often their respective event units appear within the events of the user sessions.

At processing block 350, at least one corresponding classification distance among the events is retrieved from the classification database 230. In one embodiment, the event classification engine 204 searches the classification database 230 to extract the corresponding classification distances based on parsed event units of the events stored within the event logs 210 during the predetermined number of user search and navigation sessions.

At processing block 360, the session distance is compared to the retrieved classification distance. In one embodiment, the event classification engine 204 further compares the one or more session distances related to the received events with the one or more retrieved classification distances to ascertain whether the events stored within the classification database 230 are properly classified within the respective classification categories.

At processing block 370, a predetermined error code is assigned to each event if the session distance and the classification distance are different. In one embodiment, the event classification engine 204 analyzes the events to determine if one or more classification categories are proper or if each event is potentially misclassified or inadvertently omitted from the classification database 230 and assigns a predetermined error code to each event if the session distances and the classification distances are different. Finally, the event classification engine 204 outputs a list of classification errors containing the identified events and their corresponding error codes for further analysis, either through manual editing by editors associated with the entity 100, or, in the alternative, through automatic editing within the entity 100.

In one embodiment, the system 108 and the associated methods to facilitate automatic identification of event classification errors, described in detail above in connection with FIGS. 2-4, may be used in a behavioral targeting system, which is configured to identify interests of users based on the users' online activities.

Figure 5:
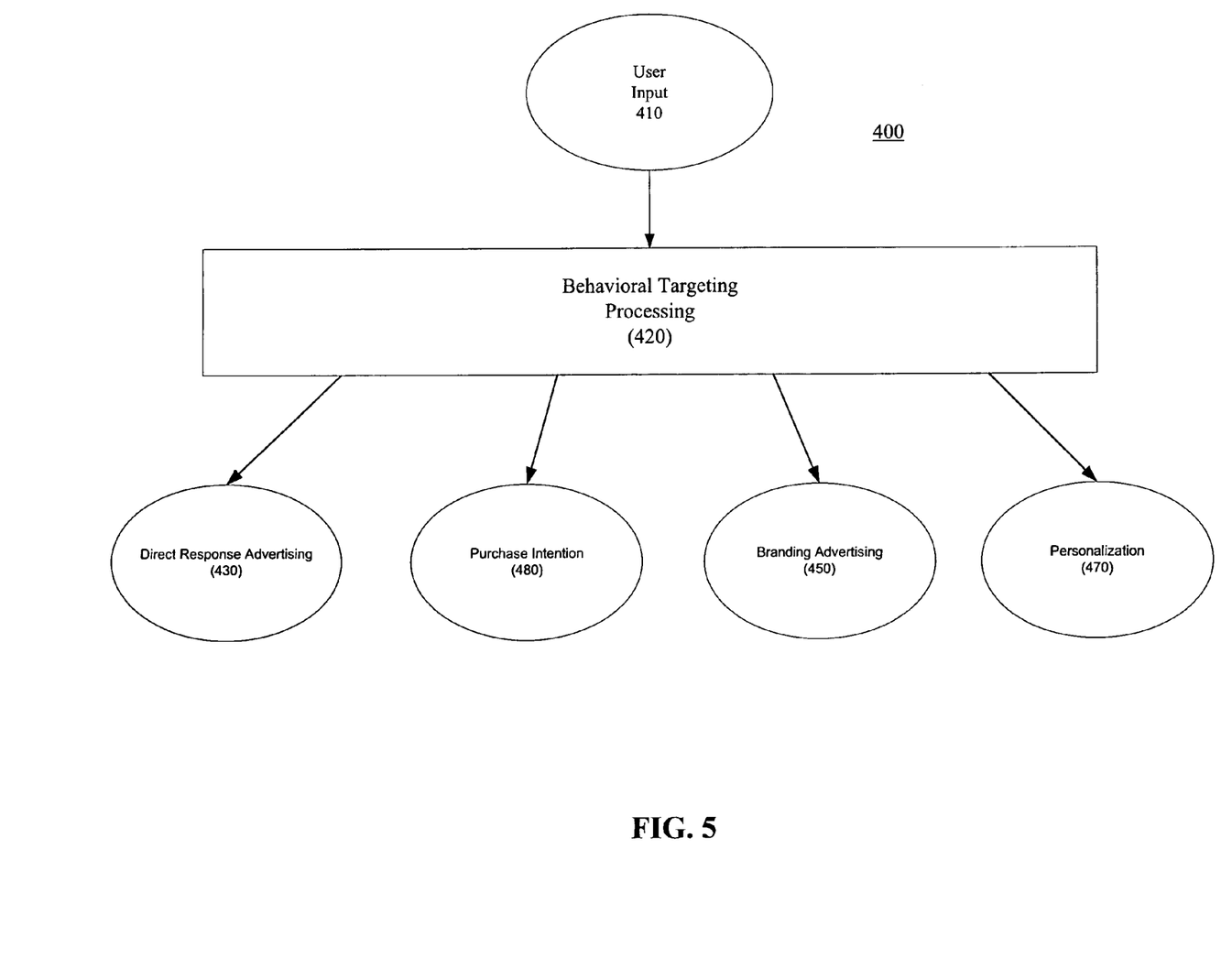
FIG. 5 is a block diagram illustrating a generalized behavioral targeting system.

FIG. 5 is a block diagram illustrating a generalized behavioral targeting system. The behavioral targeting system 400 includes a behavioral targeting processing module 420, which captures the user input 410, such as, for example, one or more events. The behavioral targeting processing module 420 generates a plurality of user interest profiles specific for a target objective. A user interest profile further provides an indication of interest in a subject matter for a particular objective. For example, the user profile output may indicate that the user is a good candidate for a particular objective regarding a "finance" topic, and a poor candidate for the specific objective regarding a "music" topic.

In one embodiment, the behavioral targeting processing module 420 generates user interest profiles for marketing objectives. As shown in FIG. 5, the behavioral targeting system 400 outputs user interest profiles for direct response advertising (430), brand awareness advertising (450), personalization activities (470), and purchase intention activities (480).

Figure 6:
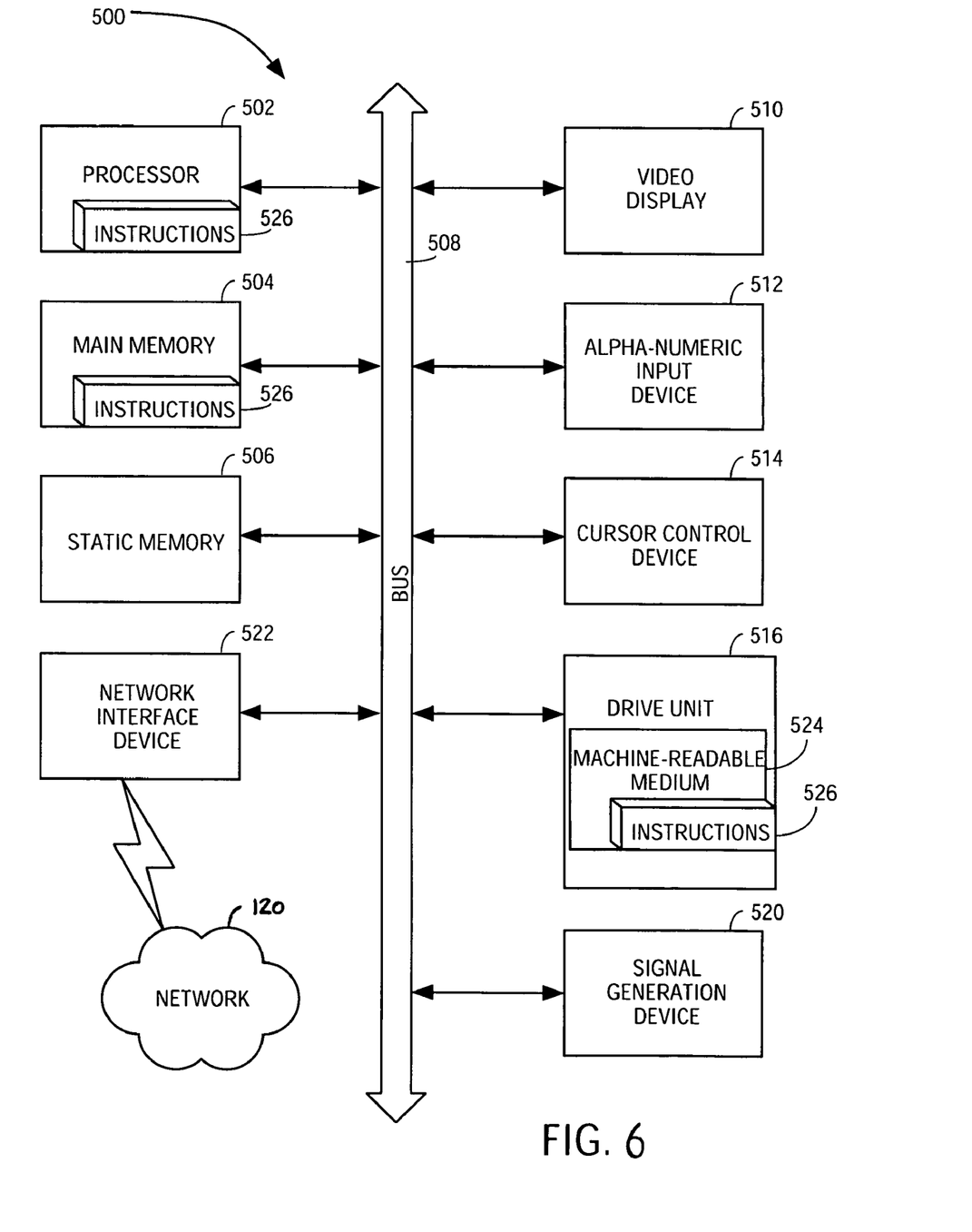
FIG. 6 is a diagrammatic representation of a machine in the exemplary form of a computer system within which a set of instructions may be executed.

FIG. 6 shows a diagrammatic representation of a machine in the exemplary form of a computer system 500 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 500 includes a processor 502, a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 518 (e.g., a speaker), and a network interface device 520.

The disk drive unit 516 includes a machine-readable medium 524 on which is stored a set of instructions (i.e., software) 526 embodying any one, or all, of the methodologies described above. The software 526 is also shown to reside, completely or at least partially, within the main memory 504 and/or within the processor 502. The software 526 may further be transmitted or received via the network interface device 520.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; or any other type of media suitable for storing information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
   storing, as previously classified events, a plurality of events classified into classification categories, said event comprises actions by a user entity over a network;
   retrieving session data from a plurality of logs, said session data further comprising events logged by a user entity over a network during a predetermined number of user sessions;
   processing said session data to determine distance relationships among said events within said session data;
   determining classification distances between said classification categories and said previously-classified events;
   comparing said distance relationships from said session data to said classification distance to identify event classification errors in said previously-classified events; and
   assigning a predetermined error code to each event associated with an event classification error within said session data for further analysis of said event classification errors.

2. The method according to claim 1, further comprising:
   identifying a category related to at least one of said each event; and
   assigning said at least one event to said identified category within said data storage module.

3. The method according to claim 1, further comprising:
   identifying a category related to at least one of said each event;
   storing said identified category within said data storage module; and
   assigning said at least one event to said identified category within said data storage module.

4. The method according to claim 1, wherein said processing said session data further comprises:
   parsing each event within said session data to obtain at least one event unit;
   determining a frequency parameter of co-occurrence of said at least one event unit within said predetermined number of user sessions; and
   determining at least one session distance among said events based on said frequency parameter.

5. The method according to claim 4, wherein said determining classification distances further comprises:
   retrieving at least one classification distance from said data storage module, said at least one classification distance representing a relation of said previously-classified events to corresponding classification categories within said data storage module; and
   comparing said at least one session distance to said at least one retrieved classification distance to ascertain said event classification errors.

6. The method according to claim 4, wherein a sum of said at least one session distance forms a concept network of events.

7. The method according to claim 1, wherein said session data further comprises search queries entered by said user entity.

8. The method according to claim 1, wherein said session data further comprises web page views accessed by said user entity.

9. A system comprising:
   at least one data storage module containing a plurality of previously-classified events classified into classification categories; and
   an event classification platform coupled to said at least one data storage module, said event classification platform to retrieve session data from a plurality of logs, said session data further comprising events logged by a user entity over a network during a predetermined number of user sessions, to process said session data to determine distance relationships among event units within said session data, to determine classification distances between said classification categories and said previously-classified events, to compare said distance relationships from said session data to said classification distance to identify event classification errors in said previously-classified events, and to assign a predetermined error code to each event associated with an event classification error within said session data for further analysis of said event classification errors.

10. The system according to claim 9, wherein said event classification platform further identifies a category related to at least one of said each event, and assigns said at least one event to said identified category within said data storage module.

11. The system according to claim 9, wherein said event classification platform further:
   identifies a category related to at least one of said each event, stores said identified category within said data storage module, and
   assigns said at least one event to said identified category within said data storage module.

12. The system according to claim 9, wherein said event classification platform further comprises:
   a parser module to parse each event within said session data to obtain at least one event unit; and
   an event classification engine coupled to said parser module, said event classification engine to determine a frequency parameter of co-occurrence of said at least one event unit within said predetermined number of user sessions, and to determine at least one session distance among said events based on said frequency parameter.

13. The system according to claim 12, wherein said event classification engine further:
   retrieves at least one classification distance from said at least one data storage module, said at least one classification distance representing a relation of said previously-classified events to corresponding classification categories within said at least one data storage module, and
   compares said at least one session distance to said at least one retrieved classification distance to ascertain said event classification errors.

14. The system according to claim 12, wherein a sum of said at least one session distance forms a concept network of events.

15. A computer readable medium containing executable instructions, which, when executed in a processing system, cause said processing system to perform a method comprising:
   storing, as previously classified events, a plurality of events, said event comprises actions by a user entity over a network;
   retrieving session data from a plurality of logs, said session data further comprising events logged by a user entity over a network during a predetermined number of user sessions;
   processing said session data to determine distance relationships among event units within said session data;
   determining classification distances between said classification categories and said previously-classified events;
   comparing said distance relationships from said session data to said classification distance to identify event classification errors in said previously-classified events; and
   assigning a predetermined error code to each event associated with an event classification error within said session data for further analysis of said event classification errors.

16. The computer readable medium according to claim 15, further comprising:
   identifying a category related to at least one of said each event; and
   assigning said at least one event to said identified category within said data storage module.

17. The computer readable medium according to claim 15, further comprising:
   identifying a category related to at least one of said each event;
   storing said identified category within said data storage module; and
   assigning said at least one event to said identified category within said data storage module.

18. The computer readable medium according to claim 15, further comprising:
   parsing each event within said session data to obtain at least one event unit;
   determining a frequency parameter of co-occurrence of said at least one event unit within said predetermined number of user sessions; and
   determining at least one session distance among said events based on said frequency parameter.

19. The computer readable medium according to claim 18, further comprising:
   retrieving at least one classification distance from said data storage module, said at least one classification distance representing a relation of said previously-classified events to corresponding classification categories within said data storage module; and
   comparing said at least one session distance to said at least one retrieved classification distance to ascertain said event classification errors.

20. The computer readable medium according to claim 18, wherein a sum of said at least one session distance forms a concept network of events.

21. An apparatus comprising:
   means for storing, as previously classified events, a plurality of events, said event comprises actions by a user entity over a network;
   means for retrieving session data from a plurality of logs, said session data further comprising events logged by a user entity over a network during a predetermined number of user sessions;
   means for processing said session data to determine distance relationships among event units within said session data;
   means for determining classification distances between said classification categories and said previously-classified events;
   means for comparing said distance relationships from said session data to said classification distance to identify event classification errors in said previously-classified events; and
   means for assigning a predetermined error code to each event associated with an event classification error within said session data for further analysis of said event classification errors.

22. The apparatus according to claim 21, further comprising:
   means for identifying a category related to at least one of said each event; and
   means for assigning said at least one event to said identified category within said data storage module.

23. The apparatus according to claim 21, further comprising:
   means for identifying a category related to at least one of said each event;
   means for storing said identified category within said data storage module; and
   means for assigning said at least one event to said identified category within said data storage module.

24. The apparatus according to claim 21, further comprising:
  means for parsing each event within said session data to obtain at least one event unit;
  means for determining a frequency parameter of co-occurrence of said at least one event unit within said predetermined number of user sessions; and
  means for determining at least one session distance among said events based on said frequency parameter.

25. The apparatus according to claim 24, further comprising:
  means for retrieving at least one classification distance from said data storage module, said at least one classification distance representing a relation of said previously-classified events to corresponding classification categories within said data storage module; and
  means for comparing said at least one session distance to said at least one retrieved classification distance to ascertain said event classification errors.

* * * * *